(12) United States Patent
Park

(10) Patent No.: US 6,361,693 B1
(45) Date of Patent: Mar. 26, 2002

(54) POROUS CERAMIC FILTER

(75) Inventor: Jin-Joo Park, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/514,698

(22) Filed: Feb. 28, 2000

(30) Foreign Application Priority Data

Jun. 15, 1999  (JP) ............................................. 11-167855

(51) Int. Cl.$^7$ ............................................... B01D 63/00
(52) U.S. Cl. ........................... 210/321.89; 210/321.79; 210/321.8; 210/321.88; 210/323.2
(58) Field of Search ....................... 210/321.78, 321.79, 210/321.8, 321.87, 321.88, 321.89, 323.2; 501/97.1, 98.1

(56) References Cited

U.S. PATENT DOCUMENTS

| | | |
|---|---|---|
| 5,618,765 A | 4/1997 | Takeuchi et al. |
| 5,695,700 A | 12/1997 | Takeuchi et al. |
| 5,846,460 A | 12/1998 | Matsuura et al. |
| 5,906,739 A | 5/1999 | Osterland et al. |

FOREIGN PATENT DOCUMENTS

| | | |
|---|---|---|
| CH | 681281 | 2/1993 |
| EP | 0899003 | 3/1999 |
| JP | 1-501534 | 6/1989 |
| JP | 4-892 | 1/1992 |
| JP | 4-893 | 1/1992 |
| JP | 5-146609 | 6/1993 |
| JP | 6-11370 | 2/1994 |
| JP | 9-100179 | 4/1997 |
| JP | 11123308 | 5/1999 |
| WO | WO88/07398 | 10/1988 |
| WO | WO90/03831 | 4/1990 |
| WO | 3-500386 | 1/1991 |
| WO | WO94/27929 | 12/1994 |

*Primary Examiner*—John Kim
(74) *Attorney, Agent, or Firm*—W. F. Fasse; W. G. Fasse

(57) ABSTRACT

A filter includes a plurality of filter units formed of a porous ceramic medium arranged and housed in a casing, and having therethrough a circulatory line for passing a feed fluid and a discharging route for passing a permeated fluid. The circulatory line and the discharging route are separated from each other by partially sealing those portions of the filter units which are fixed to opposite ends of the casing. The filter unit is structured to basically have a large number of open channels communicating with the circulatory line and passing the feed fluid and closed channels passing the permeated fluid, and a large number of discharge holes penetrating a solid portion of the porous ceramic medium to discharge the permeated fluid. As seen in any cross section of the filter orthogonal to one direction thereof, the plurality of filter units occupy an area corresponding to at least 35% of an internal area of the casing. Such structure can provide an increased permeated flow therethrough with small pressure drop.

14 Claims, 14 Drawing Sheets

POROUS CERAMIC FILTER

BACKGROUND OF THE INVENTION

1. Field of the Invention

The present invention relates generally to fluid filters with a filter unit of a porous ceramic medium, and particularly to those useful in minute or micron fluid filtration, ultra fluid filtration and reverse-osmosis fluid separation, and gas separation.

2. Description of the Background Art

Conventionally, in processes for manufacturing foods, chemicals, semiconductors and the like, filter units (also referred to simply as "units" hereinafter) formed of porous organic membranes are used to filter fluids. An organic membrane, however, is less resistant to heat, pressure and chemicals and it is thus being replaced with a membrane formed of a porous ceramic medium which is highly resistant to heat, pressure and chemicals. Furthermore, in recent years such ceramic membrane has also been applied to a bio-reactor such as a carrier for microorganism incubation, a catalyst carrier, and the like.

Recently there has been an increased demand particularly for such a porous ceramic membrane that has a significantly high permeability and also has a high resistance for stress capable of resisting a pressure of a fluid even if the membrane has a reduced thickness. In order for a membrane to have an enhanced permeability the membrane must have its porosity increased to reduce its resistance given to a fluid permeating therethrough and also have its pores reduced in diameter to allow finer components in the fluid to be separated. In other words, the membrane requires enhanced separation capability. Normal ceramic conventionally used, such as alumina ($Al_2O_3$), can, however, only provide for a porous medium having a porosity of at most 40%, normally at most 30% or therearound. This results in more of pressure drop through the membrane when it is filtered. Thus such a unit as only making use of its pores is inefficient and thus does not meet the demand as described above.

To overcome such disadvantage, a porous ceramic medium can be molded in the form of a cylinder having a multi-layered structure to allow a fluid to in practice permeate through a membrane of a reduced thickness and thus minimize its pressure drop. More specifically, a collection of units, or a filter module (also referred to as a "module" hereinafter), formed of the porous ceramic medium, has a multi-layered structure configured of a porous membrane with filtration capability, a base supporting the membrane, and an intermediate, posed between the membrane and the base if required.

To put such modules to practical use, a unit must be designed to have a structure to allow a fluid permeating through a membrane to have an increased flow per unit permeation-area of the membrane and it also must have its external dimensions minimized. To achieve this goal, a monolith structure has been developed. Such unit has a cross section, as shown in FIG. 23. In the figure, a filter unit 1 is in the form of a lotus root, with a porous ceramic medium 2 having provided therein a large number of channels or cells 3 passing a feed fluid. Note that a "feed fluid" refers to a fluid before it is filtered and a "permeated fluid" refers to a fluid after it is filtered. Exemplary monolith structures are disclosed in Japanese Patent National Publication Nos. 1-501534 and 3-500386 and Swiss Patent CH 681281. A monolith structure also basically has a multi-layered structure having a porous membrane and a base supporting the membrane. Providing a multi-layered structure internal to a channel of a module having such a cross section as shown in FIG. 23, however, requires a rather complicated process and hence an additional cost. Instead, if a porous medium of the above-mentioned normal ceramic is provided having a mono-layer structure to allow a fluid permeating through a membrane with small pressure drop, the membrane must have a reduced thickness. In practice it is no more than 1 mm, although such thickness significantly reduces the membrane's resistance for stress.

WO 94/27929 (Japanese Patent National Republication No. 06-827929) discloses a porous medium of silicon nitride based ceramic (a ceramic containing silicon nitride and/or sialon as a main component(s)) normally having a high porosity of no less than 50% as well as high resistance for stress. This porous ceramic medium is formed of silicon nitride and/or sialon grains each in the form of a column having an aspect ratio of no less than three, and of a binder of oxide, and the column grains of silicon nitride and/or sialon are bound together directly or via the binder of oxide to form a three-dimensional, randomly expanding network structure having a 3-point bending strength of at least 100 MPa. Such porous ceramic medium ensures that a thin membrane of a mono-layer structure, such as that described above, can have high resistance for stress. It should be noted, however, that simply replacing a monolith unit with a unit of silicon nitride based ceramic having a mono-layer structure, does not result in the unit having a filtered flow increased as expected, since as shown in FIG. 23 by a curved line a fluid must move a long distance particularly from a channel located around the center of the unit to the outer periphery of the unit and the fluid thus results in more of its pressure drop, so that the unit has its total permeated flow determined mainly by the permeated flow only from the channels adjacent to the surface of the unit.

In processes for manufacturing foods, chemicals and the like, such monolith module is normally used in cross-flow filtration in various manners. In this filtration system, as shown in FIG. 24, a feed fluid 5 in a source-fluid vessel 4 is fed by means of a feed pump 6 to a filter provided with a module 1, and a permeated fluid is discharged and thus collected through an outlet of the casing while a feed fluid that has passed through a channel or cell internal to the module is returned via a circulatory line 7 to the source-fluid vessel and re-fed to the filter repeatedly and the fluid is thus filtered.

The present inventors have also proposed in Japanese Patent Laying-Open No. 11-123308 a module having a small resistance against a permeating fluid and thus suitable for the above filtration system, formed of a thin membrane having a mono-layer structure of the above silicon nitride based ceramic medium.

For a filter employing such monolith filter module, it is important to increase its desired permeated flow (a flow rate of a permeated fluid per unit time, i.e., filtration rate). In order to do so, a collection of units, or a module, is required to pass a fluid with less of the fluid's pressure drop. However, the module is also required to have a membrane having high separation capability depending on its pores' diameter, as has been described above. Thus the two requirements must be well-balanced. Furthermore, since normally a large number of units are arranged and housed in a casing of a fixed volume their volumes cannot be arbitrarily increased to provide an enhanced permeated flow.

In order to meet the demands as above, it is essential to, with units arranged in a casing, (1) increase the amount of a fluid permeated per unit surface area of a membrane, (2)

reduce the fluid's pressure drop caused at a discharging route, and to (3) increase the membrane's surface area effective in filtration. Exemplary modules with collected and arranged units are disclosed, e.g., in Japanese Patent Publication No. 6-11370 and Japanese Patent Laying-Open No. 5-146609, although they mainly address issue (3) only and also have each module providing for a limited permeated flow. On the other hand, the module proposed in Japanese Patent Laying-Open No. 11-123308 has its individual units overcoming issues (1) and (2), although it fails to satisfactorily address issue (3).

SUMMARY OF THE INVENTION

In order to overcome the above three disadvantages simultaneously, the present inventors, while making use of the module structure proposed in Japanese Patent Laying-open No. 11-123308, have tried to achieve a reasonable arrangement of units in the module particularly to achieve an enhanced permeated flow, and as a result the present inventors have arrived at the present invention.

To achieve the above goal, in accordance with the present invention a filter includes a casing having a cross section passing a feed fluid, and a plurality of filter units housed in the casing, formed of a porous ceramic medium and having a cross section passing the feed fluid. The filter unit has a plurality of channels defined by a wall surface of the porous ceramic medium and extending in a predetermined direction, a discharge port formed at an outer peripheral wall surface of the porous ceramic medium, and a discharge hole. The channel includes an open channel penetrating in the predetermined direction and a closed channel having opposite ends sealed as seen in the predetermined direction. The discharge hole is not provided at the wall defining the open channel but the wall defining the closed channel. The closed channel communicates with another closed channel through the discharge hole to reach the discharge port. The filter units have a cross section corresponding to at least 35% of an internal cross section of the casing. In the present invention preferably the filter units have a cross section corresponding to at least 60% of the internal cross section of the casing.

The above configuration ensures that a membrane has a sufficient surface area per unit volume of the casing to provide an increased permeated flow.

In the present invention still preferably the casing has a generally circular cross section and the discharge port includes a first discharge port formed at one outer peripheral wall surface of the porous ceramic medium and a second discharge port formed at the other outer peripheral wall surface of the porous ceramic medium and communicating with the first discharge port through the discharge hole. In the plurality of filter units between the first and second discharge ports there is a distance average of no more than half an inner diameter of a cross section of the casing. In the present invention, still preferably, in the plurality of filter units between the first and second discharge ports there is a distance average of no less than one tenth and no more than one fourth of the inner diameter of the cross section of the casing.

With such configuration, a fluid that passes and permeates through the discharge hole can minimize its pressure drop to provide for an increased permeated flow.

In the present invention, preferably the open channel and the closed channel are each linearly aligned and arranged as seen in a cross section of the filter unit. In the present invention, still preferably a row or column of the open channel linearly aligned and a row or column of the closed channel linearly aligned are alternately arranged. In the present invention, still preferably the closed channel communicates with another closed channel linearly through the discharge hole to reach the discharge port.

With such configuration, a feed fluid that flows into an open channel partially flows through a solid portion of the porous ceramic medium and enters a closed channel aligned in a row or column adjacent to the open channel. As such a fluid once filtered can flow freely in the closed channel until it is discharged through the discharge hole, and the fluid thus does not receive a resistance when it permeates. Furthermore the filter units occupying more than 35% in cross section of the casing ensure that a membrane has a sufficient surface area per unit volume of the casing to provide an increased permeated flow.

In the present invention, preferably the wall is allowed to have a thickness varying to ±20% around its thickness average. With such configuration, a fluid flowing therethrough can have a pressure drop balanced in a cross section of the casing to provide a uniform and hence increased permeated flow.

In the present invention, preferably a plurality of the filter units varying in the size of cross section are combined and arranged in the casing. With such configuration, a filter membrane can be increased in surface area per unit volume of the volume occupied by the entirety of the filter, to provide an increased permeated flow.

In the present invention, preferably the porous ceramic medium is formed of silicon nitride based ceramic which is formed of silicon nitride grains and/or sialon grains each in the form of a column having an aspect-ratio average of at least three, and of a binder of oxide, and which has a porosity from 30 to 70%, an permeation-diameter average from 0.01 to 10 $\mu$m, and a 3-point bending strength of at least 100 MPa. With such configuration, a grain smaller than a maximal pore diameter observable according to mercury porosimetry can also be filtered, since in contrast to ceramic other than silicon nitride based ceramic, such as alumina-based ceramic, having pores of a round cross section in general, silicon nitride based ceramic has pores of an elongate cross section in the form of a slit. As such, alumina-based ceramic cannot filter a grain smaller than the maximal pore diameter observable according to mercury porosimetry, whereas silicon nitride based ceramic can filter a grain, for example, of approximately one fifth of the maximal pore diameter observable according to mercury porosimetry. Furthermore the silicon nitride based ceramic with the above characteristics can also provide for a pore diameter average of approximately 0.04 $\mu$m, observable according to mercury porosimetry.

In the present invention, preferably the casing has opposite ends provided with an inlet and an outlet for passing a feed fluid, and an externally connectable connector, and has a side provided with an externally connectable opening and a discharge port discharging a permeated fluid. With such configuration, the permeated fluid can be discharged and collected through the discharge port provided at the casing's side while the feed fluid that has passed through the open channel can be circulated through a circulatory line connected via a connector, and thus repeatedly fed to the filter.

In the present invention, preferably the casing is formed of at least one material selected from the group consisting of plastic, metal and ceramic. With such configuration, there can be provided a filter which is highly resistant to pressure, heat and chemicals.

In the present invention, preferably the channel has opposite ends sealed with a seal formed of at least one material selected from the group consisting of plastic, metal and ceramic. With such configuration, there can be provided a filter which is highly resistant to pressure, heat and chemicals.

In the present invention, preferably the casing has a cross section having an outer diameter from 10 mm to 500 mm and a length of 100 mm to 2000 mm passing a fluid. With such a configuration, normally the casing can readily be transported and mounted and for the casing with such cross sectional dimension a filter unit used in conjunction with the casing can be readily manufactured.

In the present invention, preferably the channel is arranged at a pitch of 0.5 mm to 3 mm. With such configuration, required resistance for stress and separation capability can be obtained while superior permeability can be maintained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
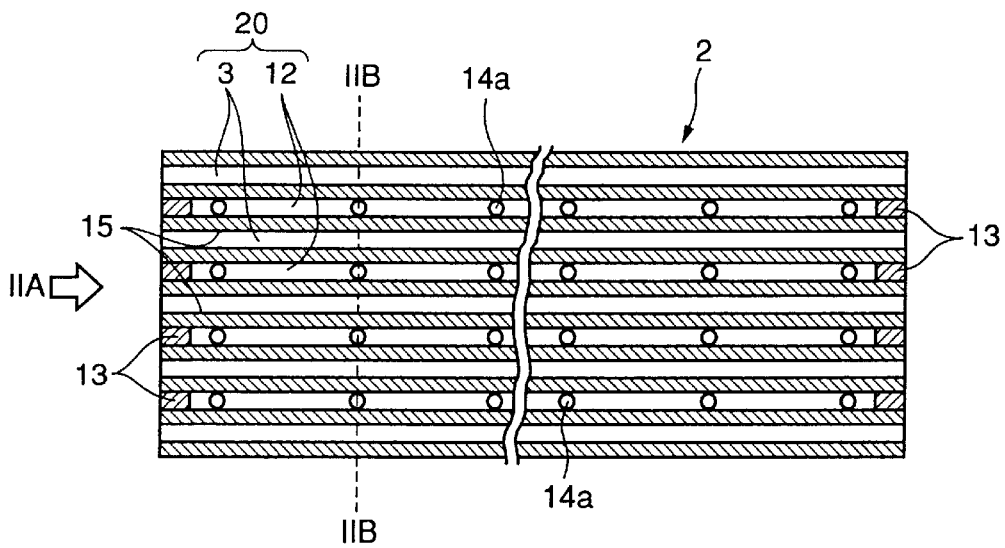
FIG. 1 is a side, cross sectional view of an exemplary filter unit of the present invention.
Figure 2A:
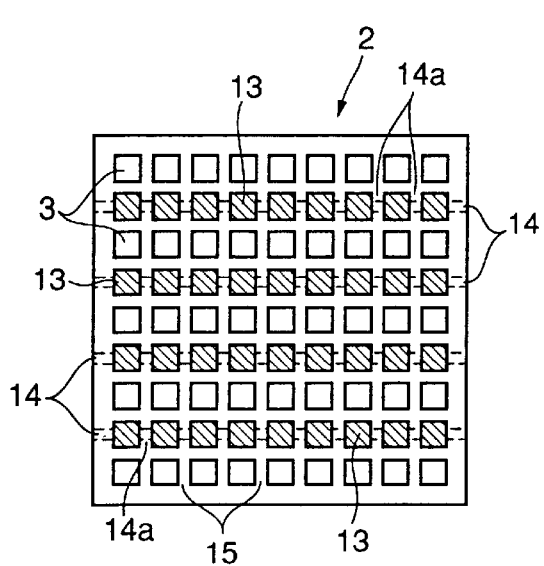
FIG. 2A is a front view of the FIG. 1 filter unit as seen in the direction IIA of FIG. 1
Figure 2B:
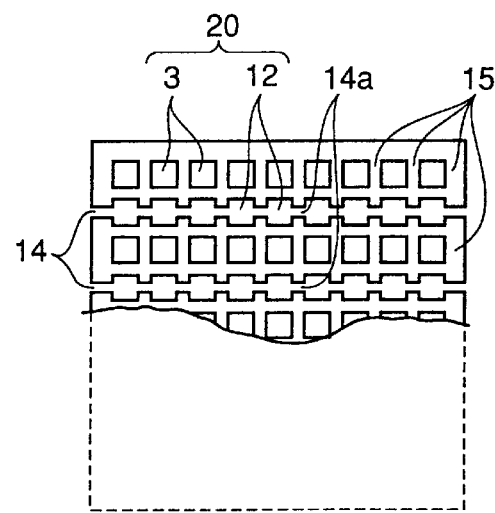
FIG. 2B is a partial cross section thereof taken along the line IIB—IIB of FIG. 1.

A filter of the present invention has a plurality of filter units formed of a porous ceramic medium and arranged as predetermined in a casing for housing the units. More specifically, a collection of the plurality of filter units configure a filter module which as a whole exhibits its permeability. Each filter unit, as seen in its side view as shown in FIG. 1 and its cross sections orthogonal to its side view as shown in FIGS. 2A and 2B, has a cross section in the form of a monolith of a porous ceramic medium 2 having therein a large number of channels arranged in a honeycomb and passing a fluid in one direction. Some of channels 20 each have an inlet and an outlet at opposite ends of the units that are blocked (sealed) to prevent a fluid from flowing therethrough. Such channel 20 with its opposite ends blocked with a seal 13 is referred to as a closed channel 12. Channel 20 without seal 13 at its opposite ends is referred to as an open channel 3, which penetrates the opposite ends of porous ceramic medium 2. A discharge hole 14a and a discharge port 14 will be described hereinafter. The porous ceramic medium has a membrane 15 (also referred to as a solid portion in the present invention) having a porous structure with a large number of fine pores as described above through which a fluid is filtered and separated.

FIG. 2A is a view of the FIG. 1 unit, as seen in the direction indicated by an arrow IIA. FIG. 2B is a cross section of the FIG. 1 unit, taken along a line IIB—IIB perpendicular to the longitudinal direction of the unit. Note that in FIG. 2A the portion which cannot be seen is indicated by broken lines. As shown in FIGS. 2A and 2B, open channel 3 and closed channel 12, as seen in any cross section thereof perpendicular to one direction thereof (herein, to the longitudinal direction of the unit, i.e., to the direction in which channel 20 penetrates), are aligned alternately on a row basis or a column basis. They are also adjacent to each other with solid ceramic portion 15 therebetween, as shown in the figures. Note that FIGS. 3A and 3B correspond to FIGS. 2A and 2B, respectively, although solid portion 15 is represented by thick solid lines. The reference characters in FIGS. 3A and 3B also correspond to those in FIGS. 2A and 2B. The cross sections shown hereinafter of the unit of the present invention will be described based on such figures.

Figure 24:
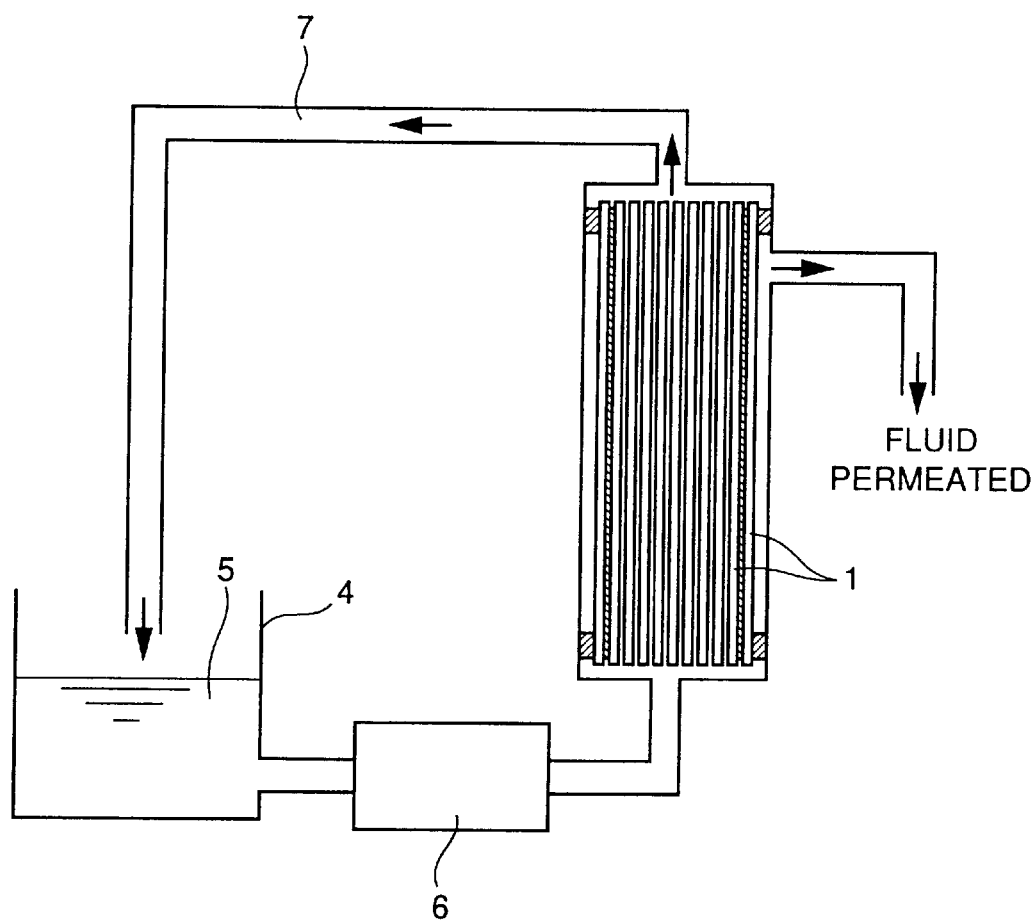
FIG. 24 illustrates a cross-flow filtration system.

Each unit arranged in the casing is fixed to the casing at its opposite ends and there open channel 3 is connected to a circulatory line 7 shown in FIG. 24. A fluid permeated and thus filtered through solid portion 15 or a permeated fluid is collected through discharge hole 14a separately drilled in the individual units at solid portion 15 spacing closed channels 12, and discharge port 14 provided at an outermost wall surface of the unit and connected to a filtration chamber of the casing. In the FIG. 1 example, as shown in FIG. 2B, discharge hole 14a and discharge port 14, as seen in a cross section perpendicular to the longitudinal direction of the unit, penetrates a membrane (solid portion 15) of the unit outwardly. A fluid which has not yet been filtered or a feed fluid returns, as shown in FIG. 24, from open channel 3 of the above-described module via circulatory line 7 of the filtration apparatus to a vessel 5 for holding the feed fluid, and the fluid is again pressurized and thus delivered to the filter and thus filtered repeatedly.

Figure 4:
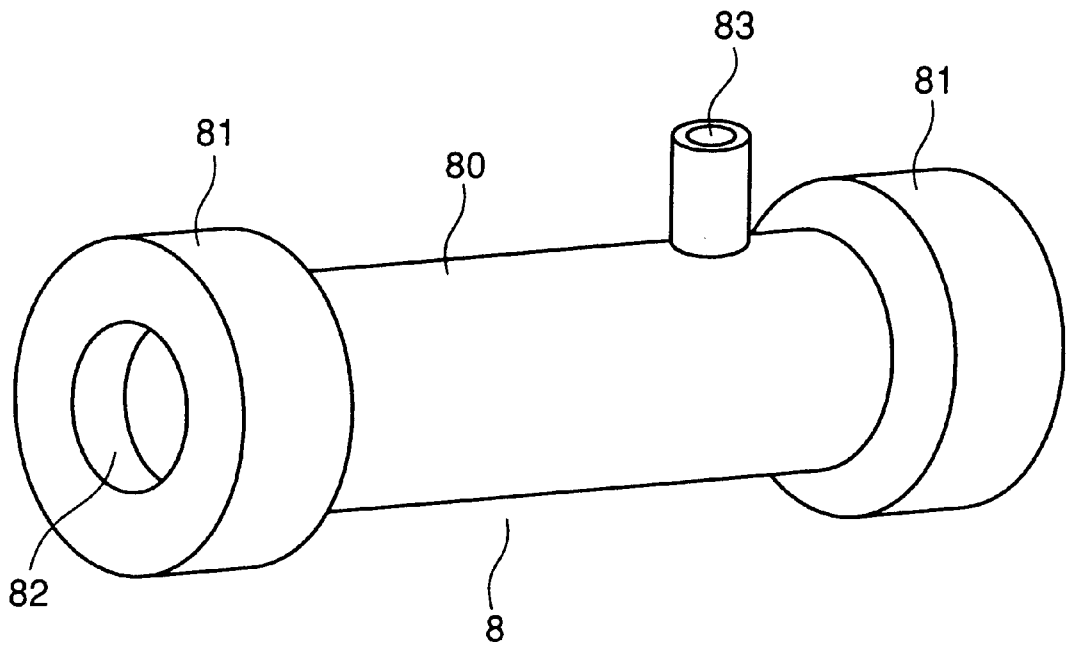
FIG. 4 is a perspective view of an exemplary casing.
Figure 5:
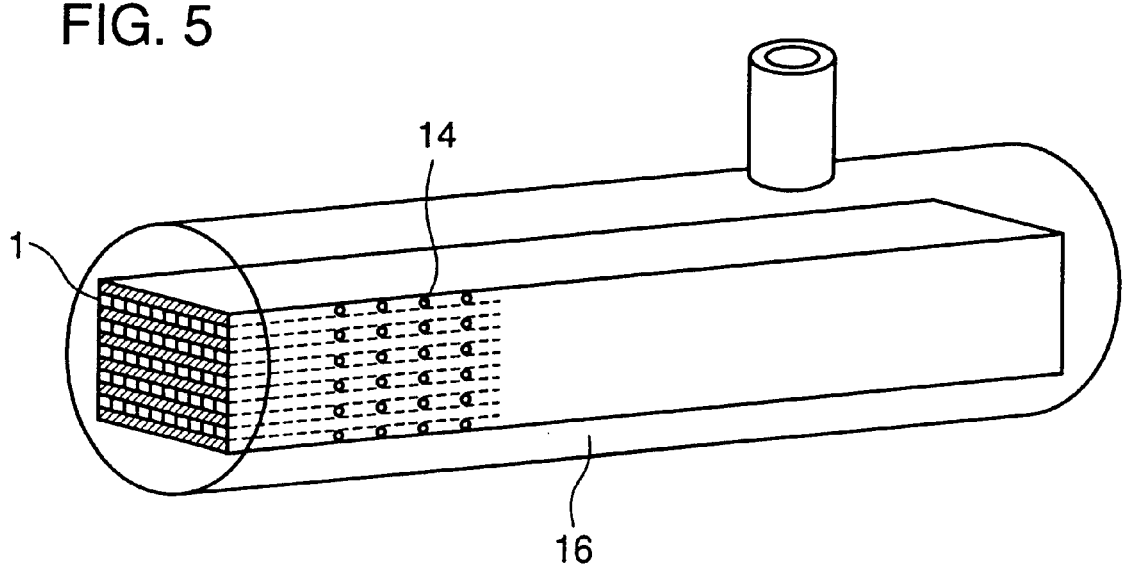
FIGS. 5–7 are transparent views each for illustrating an example of a casing with a unit/units arranged therein.

FIG. 4 is a perspective view of an exemplary casing. In this example, a casing 8 shown in the figure passes a feed fluid in the longitudinal direction thereof. Casing 8 includes a body 80, a connector or cap 81 connected to a tubing external to the body, a connection 82 to circulatory line 7, and a discharge port 83 connected to a discharging route of the filter to collect a permeated fluid. FIG. 5 is a transparent view thereof. In the figure, a single unit is arranged. A filtration vessel 16 corresponds to a space in the casing and passes the feed fluid.

Figure 6:
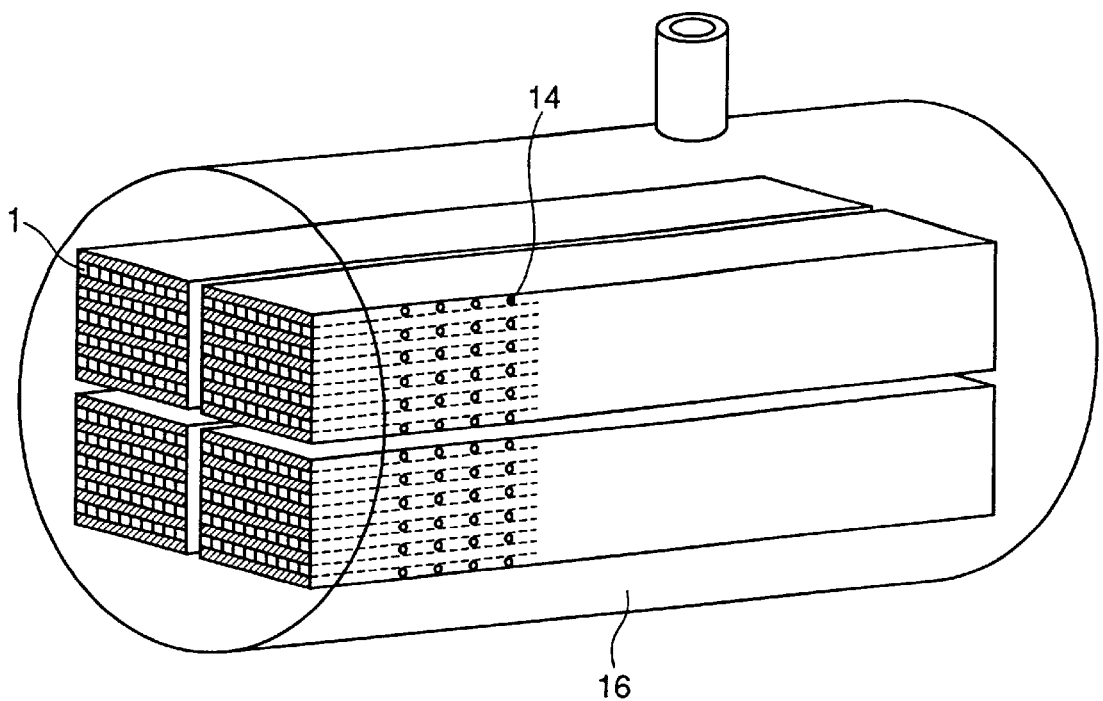
Figure 7:
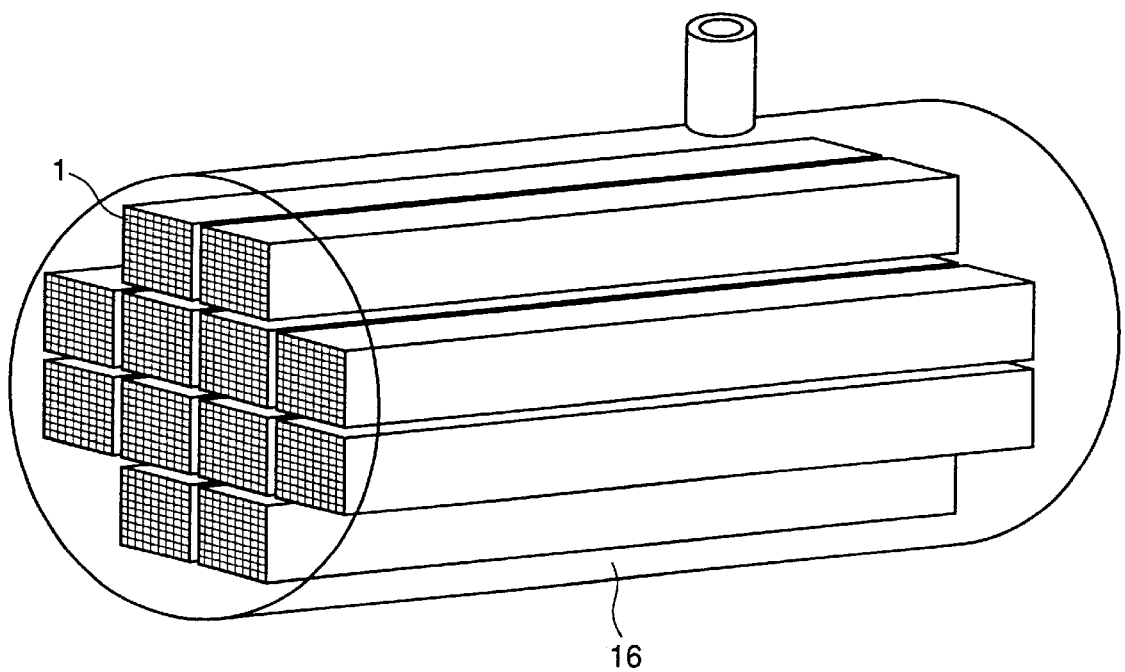
Figure 8:
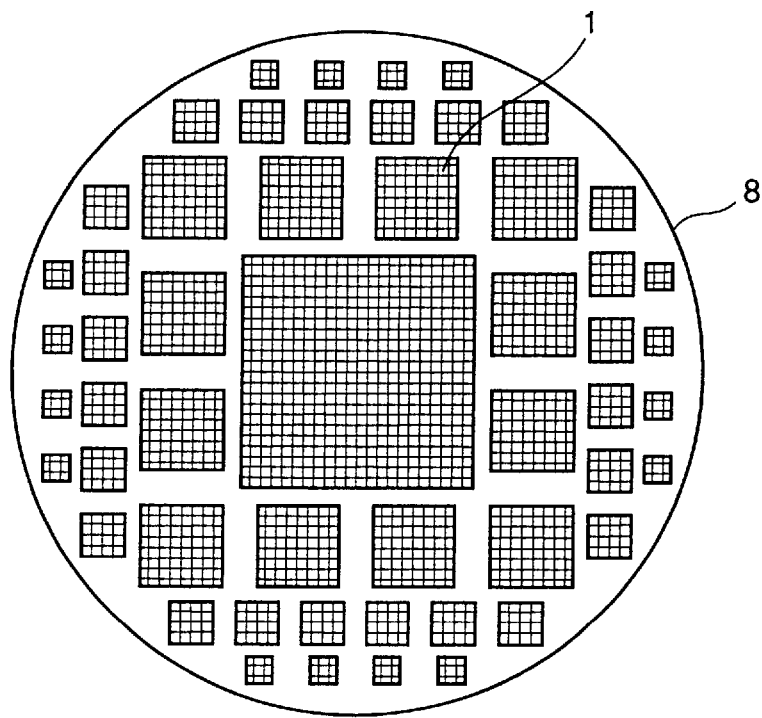
FIGS. 8–13 are cross sections of casings, showing exemplary arrangements of a plurality of units.
Figure 9:
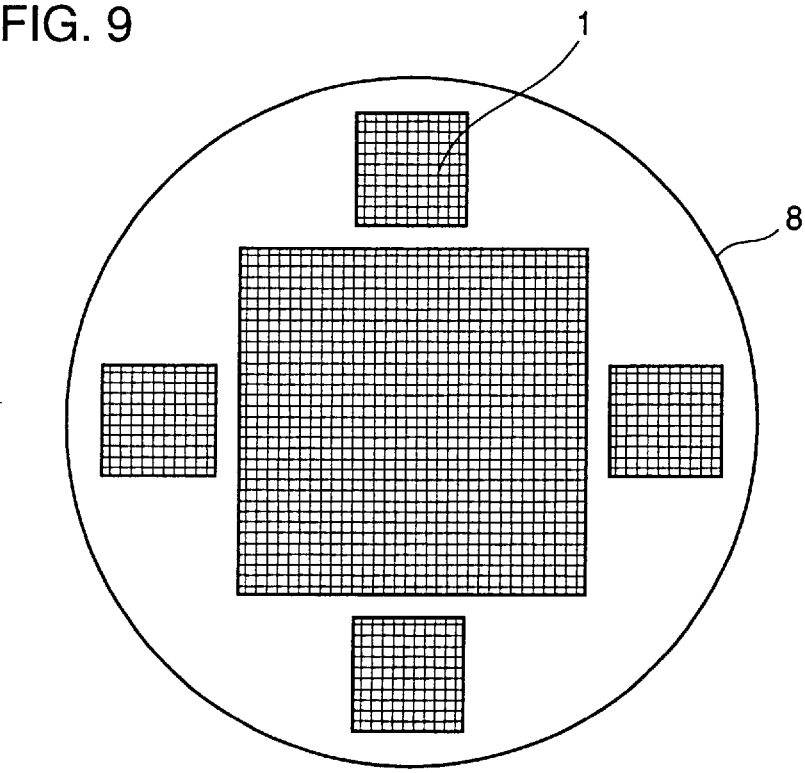

FIGS. 6 and 7 each schematically show a similarly structured casing having a circular cross section, with a large number of filter units arranged therein. In FIG. 6, four units having a square cross section are arranged. In FIG. 7, 12 units having a square cross section are arranged. In each figure, the cross section at the left end shows the arrangement of the units. Although not shown, those opposite ends of the cased individual units which correspond to closed channels 12 are sealed at the ends of the casing. FIGS. 8 and 9 show different exemplary arrangements of the units. In each example, units of variously sized squares in cross section are combined. While the above examples use square units arranged internal to a casing having a circular cross section, it is also important to vary the cross section of the casing and those of the units so that the casing has more of its inner cross section occupied by the units to increase the flow permeated per unit volume of the casing. Accordingly, each filter may have any shape, although it is preferable that there is less empty space in the casing. Furthermore, if units are arranged in the casing to create a uniformly distributed space in the casing between the units, when a fluid flows therethrough its pressure drop can be well-balanced in the cross section to allow the fluid to flow uniformly. For example, the above examples may all alternatively have their units having a circular cross section, although the space corresponding to the boundary of the units would be wider at some portions and narrower at the other potions so that a uniformly distributed space cannot be provided. Preferably the space has a width equal to no less than that of the cell. Furthermore, in order to achieve throughout a module a uniform flow rate of a fluid flowing through the units thereof and thus obtain a high, stable flow rate, it is desirable to provide a solid portion (or a membrane) of a uniform and reduced thickness. For example the unit of the present invention desirably has a membrane having a thickness of 0.1 to 0.9 mm with a variation of 20% around its thickness average.

To simply increase the filtering area in a casing (i.e., the surface area of a membrane), each unit may have an outer dimension adapted to be close to the casing's inner dimension and the number of the units may be minimized and the space in the casing that is used for arranging the units may also be reduced. In a most extreme example, a casing of any large internal dimensions can be used if a single unit sized close to the inner dimension of the casing is also used. According to a result that we have obtained, however, it has been found that units of too small sizes and those of too large sizes both result in reduced permeated flows and in some cases also result in reduced productivities in manufacturing such units. It should be noted that how a unit's size affects a permeated flow depends in effect on the relative, positional relationship of the unit with the size of the casing, and the arrangement of the unit itself.

Each unit having too large a size results in a reduced permeated flow because a fluid drops more of its pressure when it permeates (i.e., because the fluid receives an increased resistance when it flows). That is, it is because after the fluid permeates through a solid portion of a porous medium it flows in one direction along too long a discharging route. It should be noted that a size of a unit herein refers to a volume thereof and that in the above example it is a size thereof in a cross section orthogonal to the direction of the main flow of the fluid, i.e., to the longitudinal direction of the unit if the unit has a determined longitudinal size. For example, when a filter with a single unit arranged in a casing of a size, as shown in FIG. 5, and that with four units having an equal cross sectional area and arranged in a casing of the same size, as shown in FIG. 6, each with the total cross sectional area of the unit/units occupying 40 to 60% of that of the casing (i.e., each with an "occupancy", described hereinafter, of 40 to 60%), are compared under a same cross-flow condition, the latter has a permeated flow 30 to 40% higher than the former. Furthermore, the FIG. 6 filter plus an additional unit of a further reduced size that is arranged at an empty arranging space surrounding the FIG. 6 units provides a permeated flow 30 to 40% higher than the filter simply with the four units. In other words, the rate of the increment in permeated flow is greater than that of the increment in unit size. In contrast, if a single unit is used to cover the internal cross section of a casing, the unit must be of large size. A unit is limited in size, however, if it is manufactured using typical equipment to provide a reliable and inexpensive unit. As such, if a unit has too large a size, some concerns arise in manufacturing a porous ceramic medium therefor having a honeycomb cross section. For example, large-scale, expensive equipment is required for molding, filing and transporting the ceramic medium. Furthermore, the ceramic medium must be carefully transported to maintain its shape and prevent it from being damaged. This readily result in degraded productivity.

A unit of too small a size can have a flow-passing route reduced in length and a fluid flowing therethrough can thus lose less of its flow when it permeates, although a large number of units must be arranged to increase permeated flow. This results in an increased inter-unit space, so that the surface area of the membrane that is effective in filtering a fluid is not so increased as expected. Furthermore, as seen in a cross section of the casing perpendicular to the longitudinal direction, a unit and an inter-unit space repeatedly appear more frequently in the direction in which a fluid flows. As such the fluid hardly flows steadily. Thus the permeated flow provided by the entire filter is in fact reduced. The necessity of manufacturing a large number of units also degrades the productivity in manufacturing them. If a plurality of units are combined, arranging a unit of a relatively large cross section at the center of a casing and a unit of a smaller size outwardly, as shown in FIG. 8, allows larger permeated flow.

Figure 10:
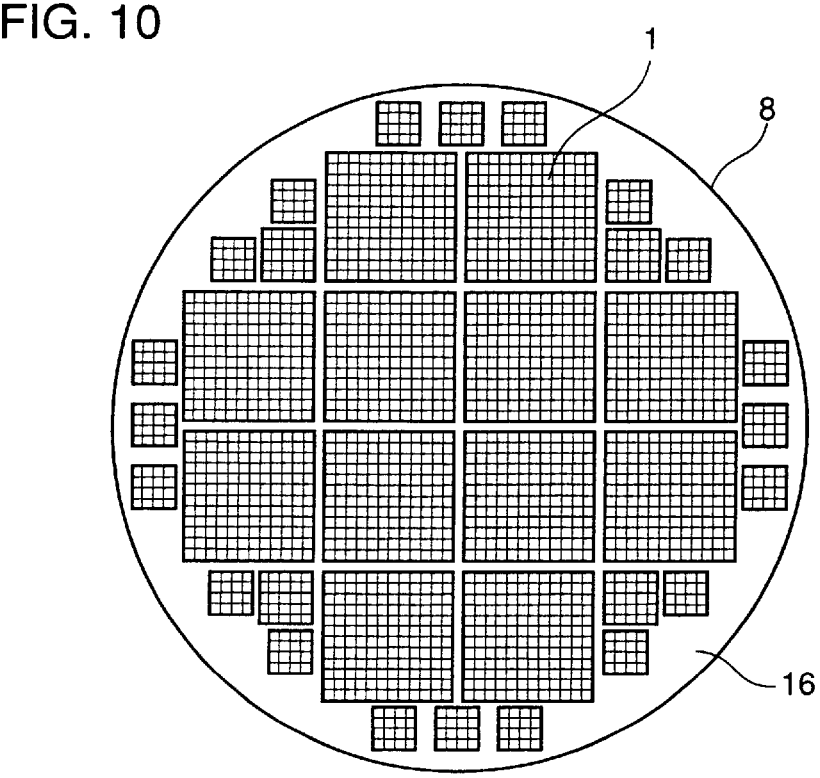
Figure 11:
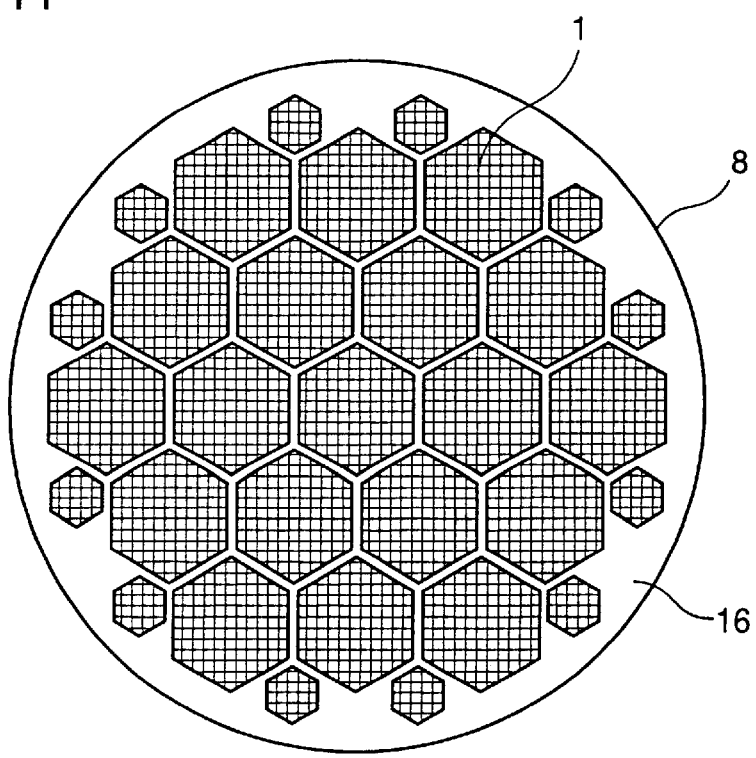
Figure 12:
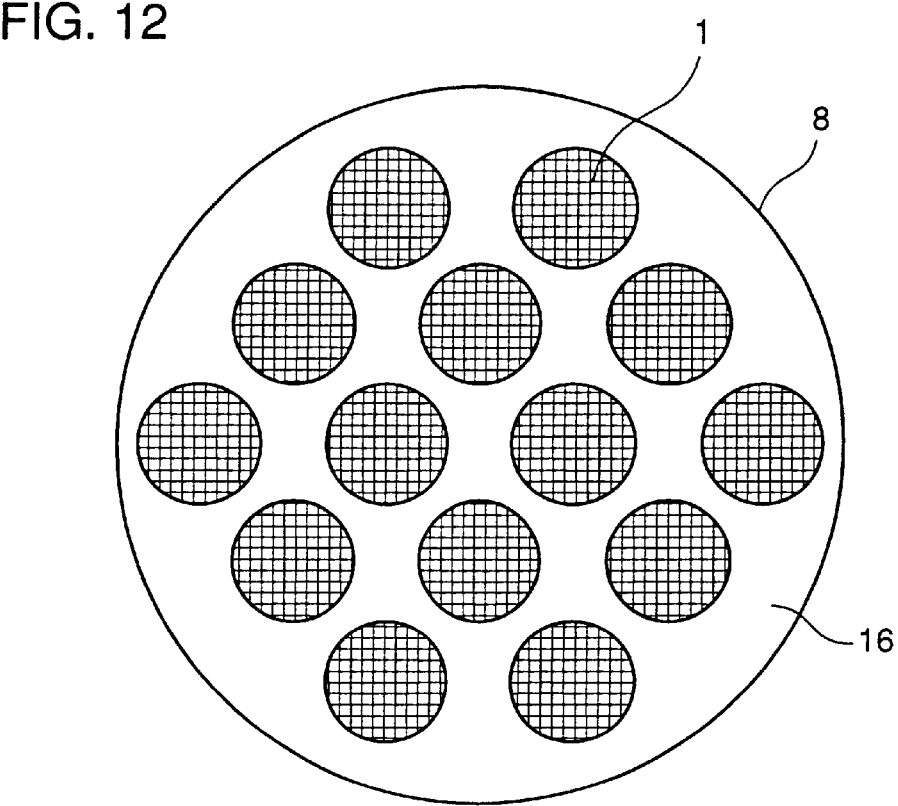
Figure 13:
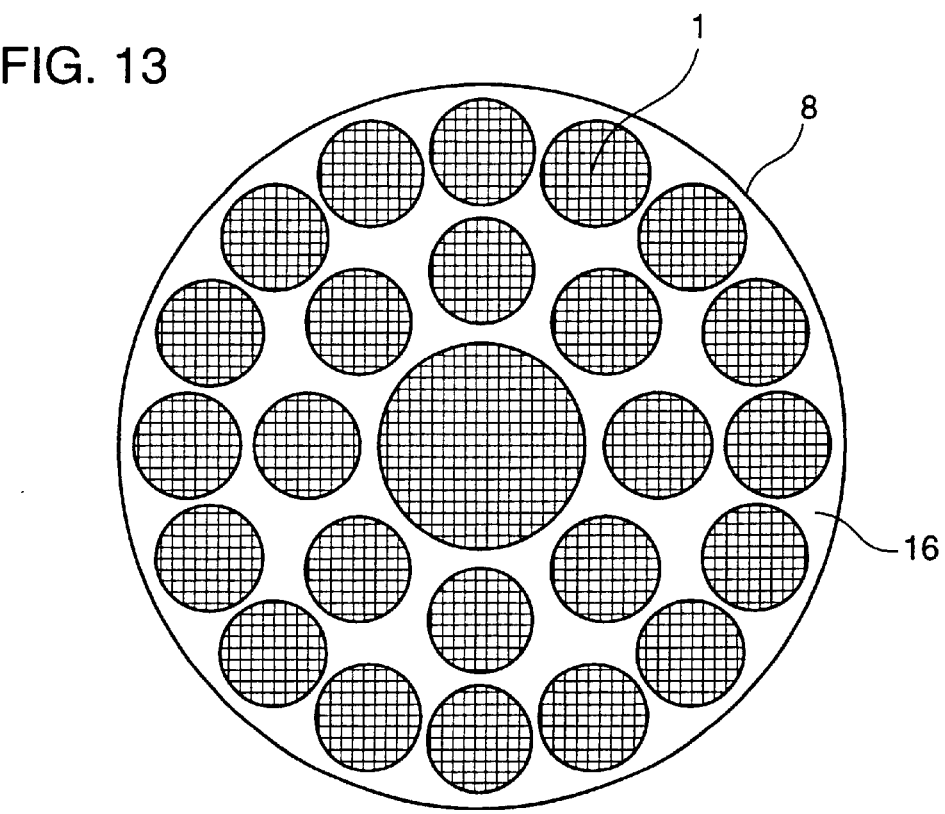

In accordance with the present invention, a filter has a plurality of arranged filter units occupying an area total corresponding to at least 35%, preferably at least 60%, of its casing's inner area, as seen in a cross section thereof perpendicular to one direction thereof (normally, to the direction of the main flow of a feed fluid). Hereinafter a rate of such area total will be referred to as a "casing area occupancy" or simply as an "occupancy." With an occupancy of less than 35%, a membrane has too small a surface area per unit volume of a casing, resulting in an extremely reduced permeated flow. For example, as shown in FIGS. 1–8, assume that a cylindrical casing houses a unit/units with channels 20 formed in its longitudinal direction. When the casing is round having an inner diameter of 300 mm and a single unit arranged therein has a circular cross section having an outer diameter of 178 mm (i.e., the FIG. 5 arrangement with the unit's cross section changed from a square to a circle, referred to as a first exemplary arrangement hereinafter) or a single unit arranged therein has a square cross section with a side of 158 mm (i.e., the FIG. 5 arrangement, referred to as a second exemplary arrangement hereinafter), a casing area occupancy of approximately 35% is achieved. When four units having a square cross section with a side of 92 mm are arranged (i.e., the FIG. 6 arrangement, referred to as a third exemplary arrangement hereinafter), an occupancy of approximately 48% is achieved. Furthermore, the second exemplary arrangement, i.e., a casing and a unit sized as above and arranged at the center of the casing, plus four units having a square cross section with a side of 60 mm and arranged in a space between the centered unit and the casing's internal wall (i.e., the FIG. 9 arrangement, referred to as a fourth exemplary arrangement hereinafter), provides an occupancy of approximately 56%. When 12 units having a square cross section with a side of 60 mm are arranged (i.e., the FIG. 7 arrangement, referred to as a fifth exemplary arrangement hereinafter), an occupancy of approximately 61% is achieved. Furthermore, such an arrangement as shown in FIG. 10 plus a unit of a smaller size arranged in a remaining empty space, provides an occupancy exceeding 65%. FIGS. 11–13 show examples with units having hexagonal and circular cross sections.

In accordance with the present invention, the filter having a casing area occupancy of at least 35% preferably also has its units with their discharge passages having a length average corresponding to no more than one half or 50%, more preferably one tenth to one fourth or 10 to 25% of the inner diameter of the casing, as seen in an internal cross section of the casing, since an length average larger than half the inner diameter of a casing results in more of pressure drop when a fluid passes through a discharge passage and this may result in a reduced permeated flow. It should be noted that a length average of discharge passages is obtained by dividing a length total of all discharge passages provided in all of a plurality of units and extending from discharge port 14 at one external wall surface through internal discharge hole 14a to discharge port 14 at the other external wall surface, by the total number of the discharge passages. In the FIG. 1 unit, for example, four discharge passages are provided as seen in a cross section orthogonal to the direction of the main flow of the feed fluid and they all have a length equal to one side of the square cross section of the unit, and in this manner there are provided a multitude of cross sectional planes with such discharge passages formed therein. If a unit has 10 cross sections with such discharge passages, it has 40 discharge passages in total. With n representing the number of discharge passages for each cross section and m representing the number of such cross sections, the second exemplary arrangement with its discharge passages formed as described above would have the discharge passages having a length average of 158 mm, which is approximately 52% of the inner diameter of the casing. For the fourth exemplary arrangement, with discharge passages formed as described above, and with the centered, large unit having n=15 and m=20 and the surrounding, smaller units having n=6 and m=20, a total of 15×20+6×20=420 discharge passages are provided having a length total of 158×15×20+60×6×20=54,600 mm, so that the discharge passages have a length average of 54,600/420= 130 mm, which corresponds to approximately 43% of the inner diameter of the casing. The third and fifth exemplary arrangements have their length averages corresponding to approximately 31% and 20%, respectively, of the inner diameter of the casing.

Desirably, in the present invention a module uses a casing sized to have an inner diameter of approximately 10 to 500 mm and an internal length of approximately 100 to 2000 mm, since when a space in which a filter is in practice equipped is considered, an outer diameter of at most approximately 500 mm and a length of at most approximately 2000 mm are an appropriate limit, except for particular cases such as large-scale plants. If a casing is larger than that described above, more effort is required when the casing is normally transported and mounted. For a casing having an outer diameter of less than 10 mm and a length of less than 100 mm, a unit inserted therein must in general have a particularly reduced size and thus be manufactured with additional effort.

First Embodiment

Figure 3A:
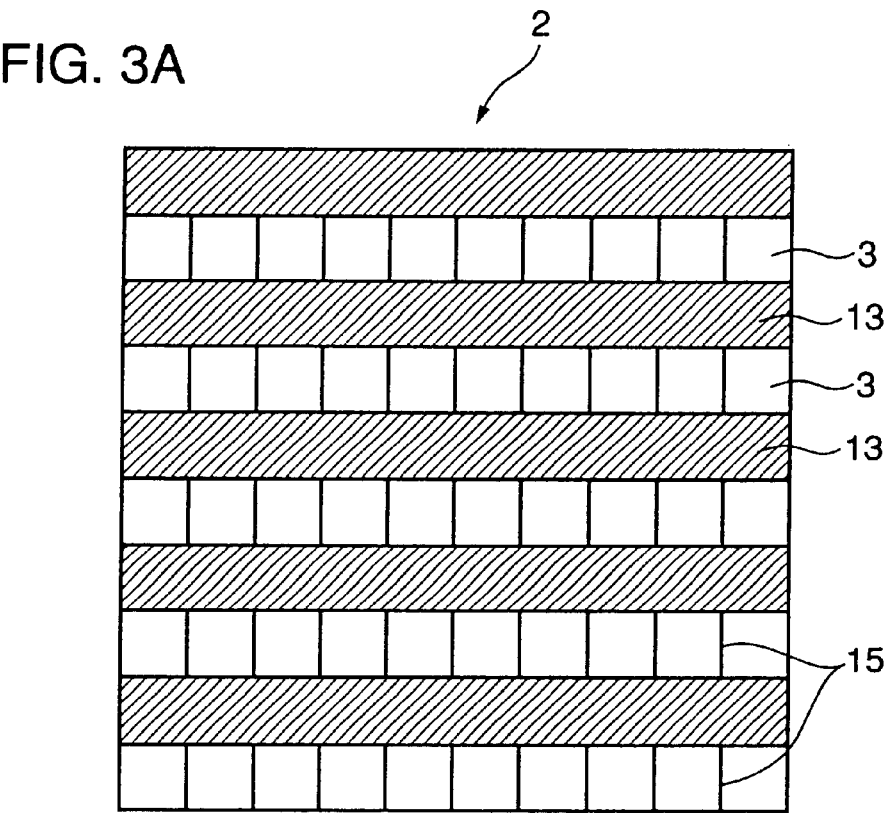
FIGS. 3A and 3B correspond to FIGS. 2A and 2B, respectively, with a filter unit's solid portion represented in black solid lines.
Figure 3B:
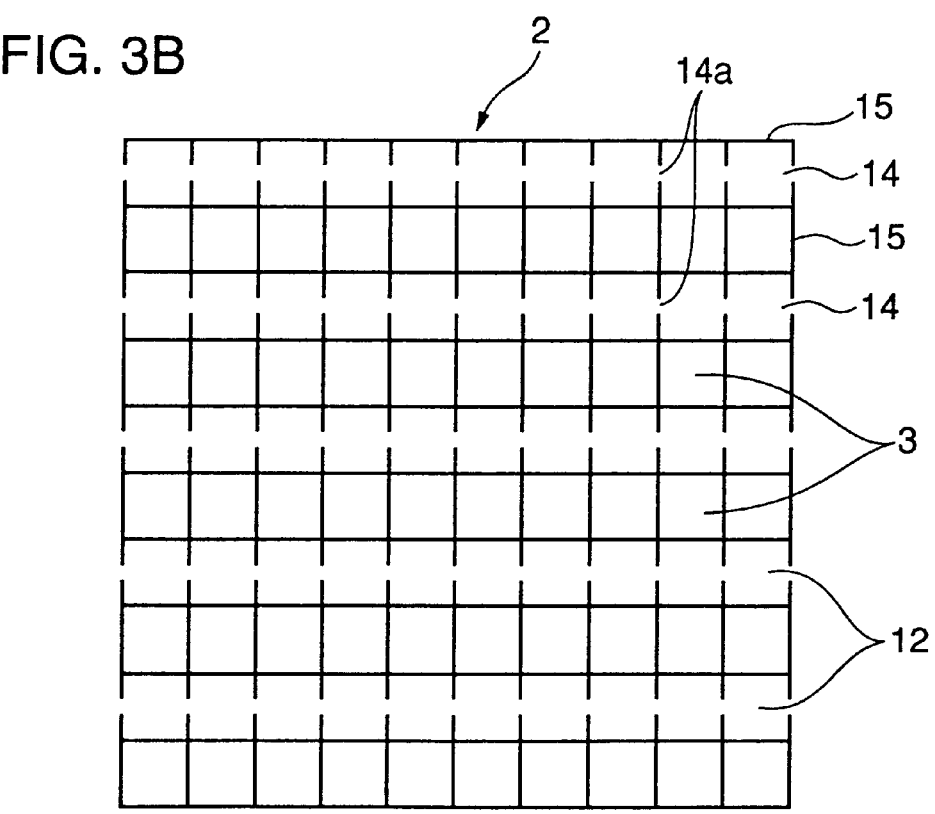
Figure 14:
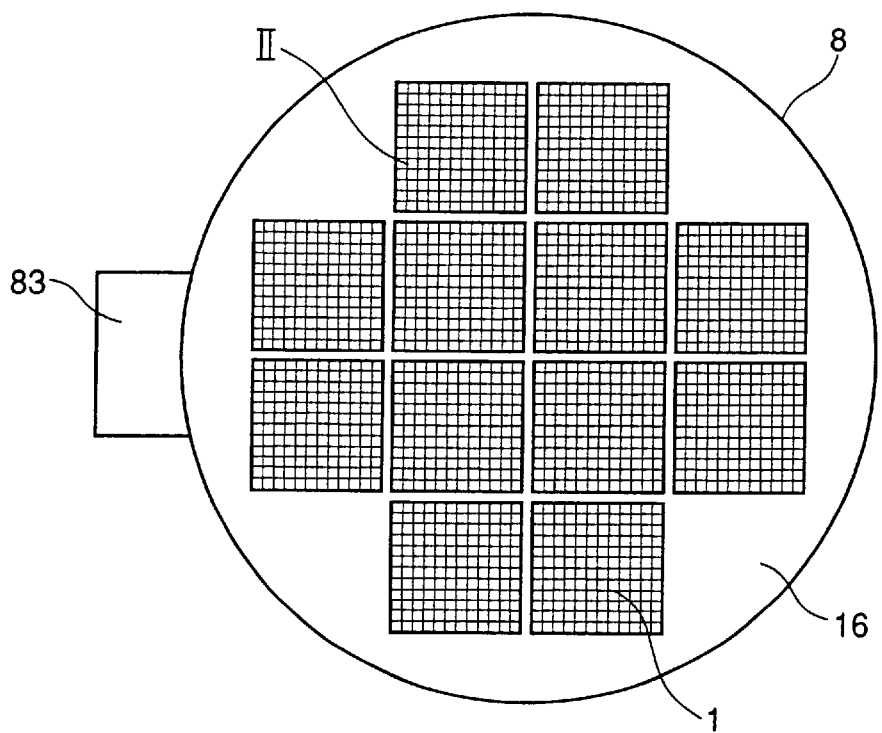
FIGS. 14–18 are cross sections of exemplary casings of the present invention with a unit/units arranged therein.
Figure 15:
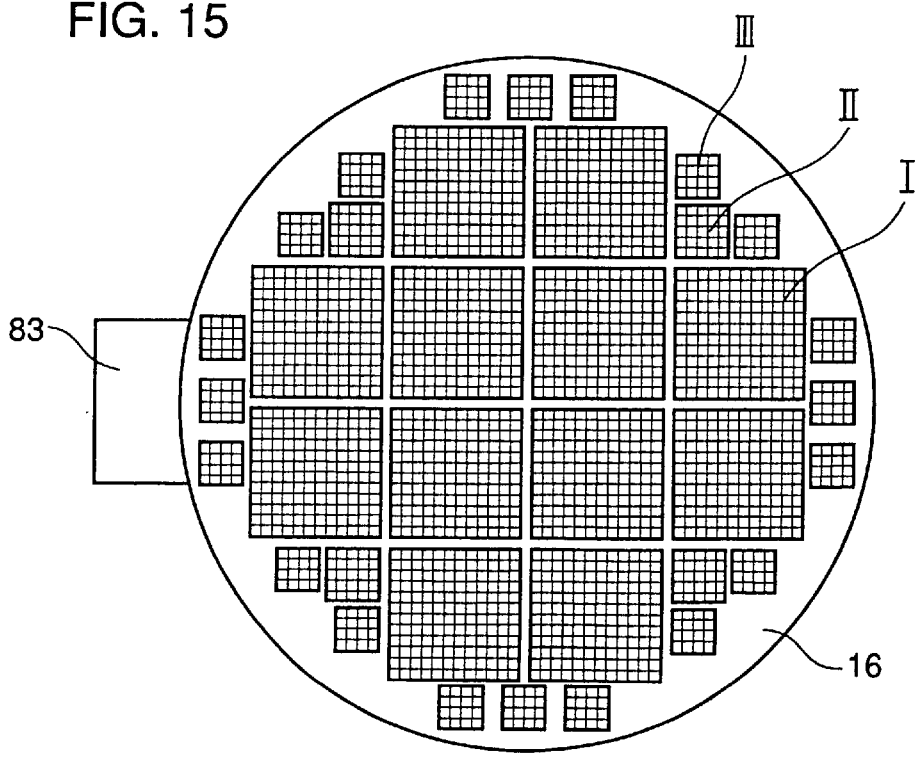
Figure 16:
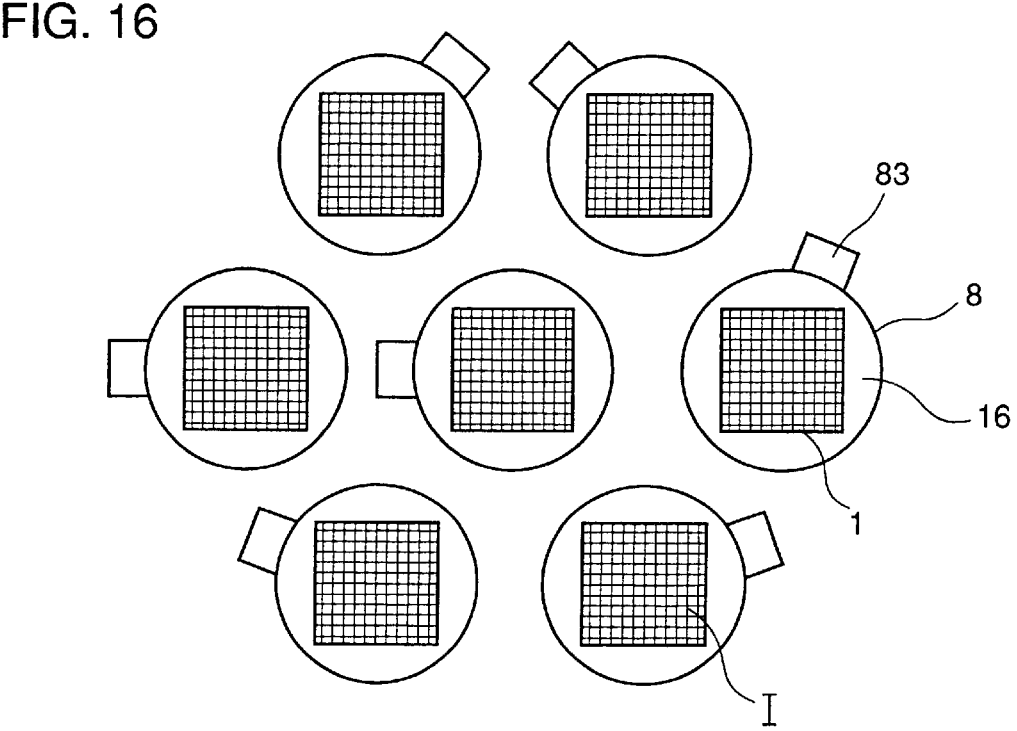

There are prepared exemplary modules of the present invention having the cross sectional structures shown in FIGS. 14 and 15 and a comparative, exemplary module having the cross sectional structure shown in FIG. 16. In the figures, a casing 8 accommodates a unit 1 formed of a silicon nitride based, porous ceramic medium, and has the remaining, empty space corresponding to a filtration chamber. Casing 8 also has a discharge port. Each unit, as seen in an enlarged view, has the cross sections as shown in FIGS. 3A and 3B. FIG. 15 shows units of three different sizes arranged. The largest unit is labeled I, the second largest unit II, and the smallest unit III. Unit I has a square cross section with a side of 17.1 mm, unit II with a side of 8.1 mm, and unit III with a side of 5.45 mm. The units each have a length of 500 mm in the direction perpendicular to the plane of the figure. In FIG. 14, 12 units I are used. Each cell has a solid portion or cell wall having a thickness of 0.29 mm with a variation to 10% around the thickness average that the units have. A cell surrounded by such cell wall has an internal, square cross section with a side of 1 mm. Units I, II, III have such cells arranged in 13 rows and 13 columns (169 cells), 6 rows and 6 columns (36 cells), and 4 rows and 4 columns (16 cells), respectively.

Such units were combined as shown in the figures. In the FIGS. 14 and 15 arrangements a plurality of units were housed in a large single casing having an outer diameter of 91 mm, an inner diameter of 88 mm and an internal length of 500 mm. In the FIG. 16 arrangement each unit was housed in a separate casing of an outer diameter of 28 mm, an inner diameter of 26 mm and an internal length of 500 mm and seven such casings were provided as a collection corresponding one module so that the casings could be accommodated in a space of the same size of that for the casing shown in FIGS. 14 and 15. The casing had opposite ends with a connector of polysulfone having an outer diameter of 110 mm and a length of 30 mm attached thereto. The entire filter including the connection was adapted to have a volume of 5321 cm$^3$.

A honeycomb unit of a silicon nitride based, porous ceramic medium was prepared as described below: Initially $Si_3N_4$ powder of α type having a grain size average of 0.5 $\mu$m with $Y_2O_3$ powder of 5% by weight having a grain size average of 1 $\mu$m and $Al_2O_3$ of 5% by weight added thereto as sub-components were kneaded in a kneader together with an organic binder and water. Then the kneaded product was extruded and thus molded into a honeycomb. The molded product was then held and sintered in an nitrogen ambient of an atmospheric pressure of five at 1800° C. for two hours. The sintered porous medium had a solid portion (a membrane portion) formed of silicon nitride grains each in the form of a column having an aspect-ratio average of 10 and partially bound together via an oxide containing the sub-component to form a three-dimensional network structure, and it had a porosity of 60%, a permeation-diameter average of 0.2 $\mu$m and a 3-point bending strength of 170 MPa. It should be noted that a "permeation-diameter average" corresponds to a grain size when an average fluid containing average grains having a grain size no less than the permeation-diameter average (of no less than 0.2 $\mu$m in the present embodiment) is filtered and no less than 99.99% of the average grains are captured and the fluid is thus prevented from permeating. In other words, the sintered porous medium of the present embodiment was capable of filtering the average fluid to permeate 99.99% of its grains of less than 0.2 $\mu$m.

Then a passage for discharging a permeated fluid (i.e., discharge hole 14a and discharge port 14 shown in FIG. 3) was drilled in the honeycomb structure at every other row of cells. All units had those 20 planes with such discharge passages which are defined in the longitudinal direction. More specifically, unit I had a number of discharge passages for each plane, or n, of five, unit II had an n of three and unit III had an n of two, and the units had a number of planes with discharge passages, or m, of 20. Then a rapid cure epoxy resin was used to preliminarily seal each unit at channels located at the honeycomb's opposite ends and serving as open channels 3. It should be noted that the epoxy seal had a reduced thickness. Thus each unit to be housed was completed.

Then each unit was arranged and thus housed in a respective casing and a chemical-resistant epoxy resin was then used to fix the unit's opposite end to the casing at its opposite ends and thus seal the unit. The chemical-resistant epoxy resin entered deeply into and thus cured in the channels that had not been preliminarily sealed. Then the opposite ends of the channels were cut off together with the cured chemical-resistant epoxy resin and the honeycomb structure. Thus the channels preliminarily sealed and thus having prevented the chemical-resistant epoxy resin from entering deeply thereinto, were opened to provide open channels. The channels that had not been preliminarily sealed and thus had the chemical-resistant epoxy resin entering deeply thereinto remained closed when the opposite ends thereof were cut off, and closed channels were thus provided.

In the exemplary structures shown in FIGS. 14, 15 and 16, the units had filtering areas of approximately 1.18 $m^2$, 1.46 $m^2$ and 0.69 $m^2$, respectively. Furthermore, the exemplary structures of FIGS. 14, 15 and 16 had casing occupancies of approximately 58%, 72% and 55%, respectively. Furthermore, in FIGS. 14, 15 and 16 the discharge passages in the units had a length average corresponding to approximately 19%, 13% and 66%, respectively, of the casing's inner diameter.

The three types of filters were each mounted to an apparatus of a cross-flow system shown in FIG. 24. Pure water containing alumina of 0.1% by weight having a grain size of 0.2 $\mu$m was passed therethrough as a feed fluid, and applying a differential pressure of 1 $kg/cm^2$ and passing the fluid at a circulatory flow rate of 2 m/s the filters' permeated flows or filtration capabilities were compared per unit time. As a result, all of the exemplary structures prevented no less than 99.99% of the alumina grains from permeating and they thus had a separation capability as aimed. The exemplary structures in FIGS. 14, 15 and 16 provided permeated flows of 82.3 lit./min., 103.5 lit./min., and 45.1 lit./min., respectively, which correspond to 15.5 cc/min.·$cm^3$, 19.5 cc/min.·$cm^3$, and 8.48 cc/min.·$cm^3$, respectively, when they are each divided by the entire volume of the associated filter.

From the above results, it has been found that: (1) when, as in a filter having the FIG. 16 cross sectional structure, each casing houses a single unit rather than a plurality of combined units and such casings are collected and accommodated in a space of the same size as that of FIGS. 14 and 15, a unit occupies 70% of a cross sectional area of the respective casing, although the module as a collection of the units provides a reduced permeated flow, as described above. This is because this structure results in a reduced area of its filter membrane per unit volume of the module; and (2) when a filter has a plurality of units arranged in a casing, as shown in the FIGS. 14 and 15 cross sections in accordance with the present invention, it has a significantly large permeated flow. Thus it may be advantageous to arrange a plurality of combined units in a single casing when an increased permeated flow is desired. When the filters of FIGS. 14 and 15 are compared, the FIG. 15 structure, higher in casing area occupancy than the FIG. 14 structure, provides a permeated flow as much as approximately 26% larger than the FIG. 14 structure.

Second Embodiment

Figure 17:
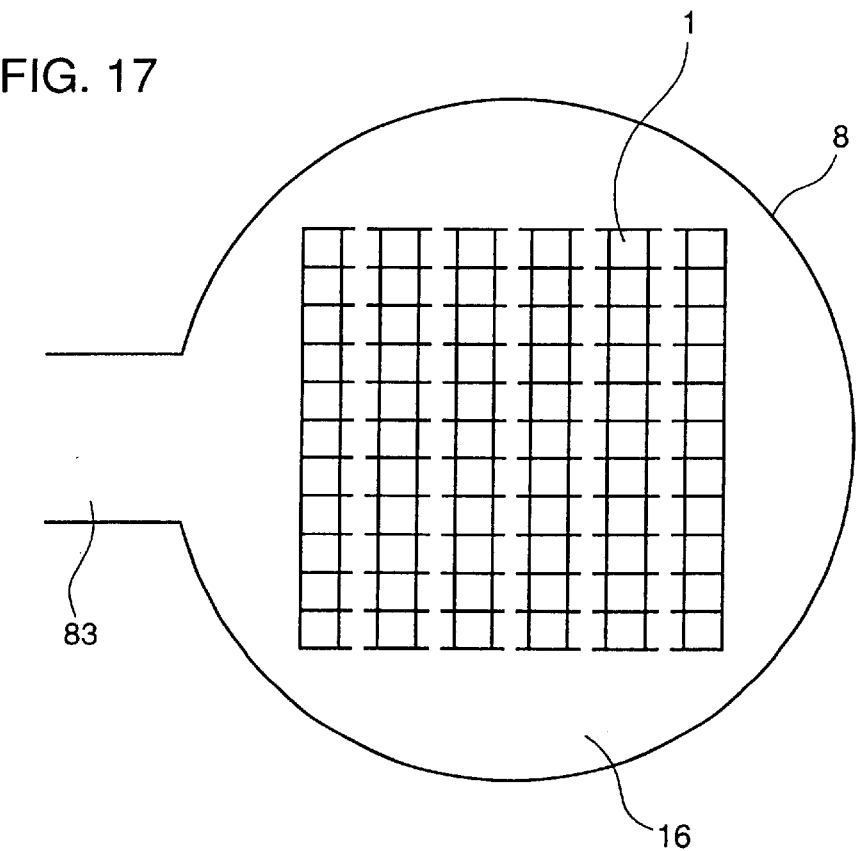
Figure 18:
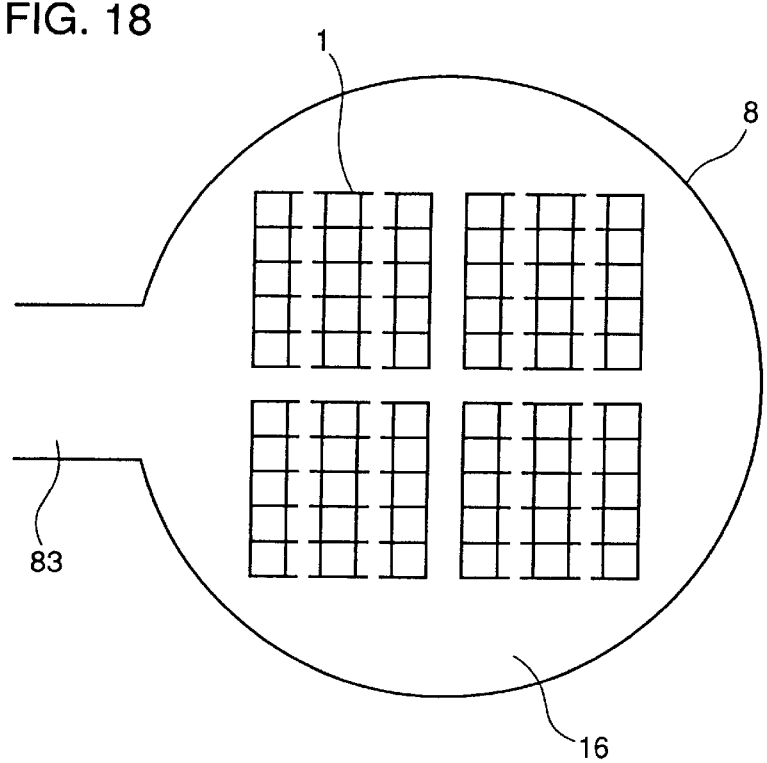

A casing having an outer diameter of 84 mm, an inner diameter of 80 mm and a length of 500 mm was prepared and therein a filter was fabricated with a unit having a solid portion (a membrane portion) of the same silicon nitride based porous ceramic medium as used in the first embodiment and arranged as shown in FIGS. 17 and 18. Each unit had its cell wall or membrane having a thickness of 0.5 mm (with a variation to ±10% around the unit's/units' average), and it had a square cross section having a side of 4 mm. With such cell used as a unit cell structure, a single unit having 121 cells (arranged in 11 rows and 11 columns), external dimensions corresponding to a square having a side of 50 mm, and a total length equal to the side of the square, i.e., 50 mm, and also having five discharge passages having a diameter of 0.7 mm, was arranged in the above-described casing at its center, as shown in FIG. 17, to prepare an assembly 1, and four units each having 25 cells (arranged in 5 rows and 5 columns), external dimensions corresponding to a square having a side of 23 mm, and a total length equal to the side of the square, i.e., 23 mm, and also having two discharge passages having a diameter of 0.7 mm, were arranged in the above-described casing, as shown in FIG. 18, to prepare an assembly 2. Assembly 1 had a membrane having a surface area of 0.288 $m^2$ and a casing area occupancy of 49.6% and assembly 2 had a membrane having a surface area of 0.288 $m^2$ and a casing area occupancy of 42.1%.

After the units were thus arranged in the casings, the units had their ends sealed and the casings had their respective connectors attached thereto, as described in the first embodiment, to prepare each filter. The filters were subjected to a cross-flow filtration test under similar conditions to those in the first embodiment. As a result of the test, assemblies 1 and 2 had permeated flows of 16.8 lit./min and 21.8 lit./min, respectively. Despite their membranes having the same surface area, assembly 2 had a permeated flow larger than assembly 1, since in assembly 2 a permeated fluid that flowed through a discharge passage dropped less of its pressure than in assembly 1.

Third Embodiment

Porous media of silicon nitride based ceramic SN1 having the same components and prepared through the same procedure as used in the first embodiment, silicon nitride based ceramic SN2, alumina based ceramic AL, and mullite based ceramic ML, were shaped into a honeycomb to provide units. The units were adjusted to have their respective solid portions having the thicknesses as shown in Table 1. Referring to Table 1, the unit of silicon nitride ceramic labeled SN2 was prepared as below: Initially $Si_3N_4$ powder of $\alpha$ type having a grain size average of 3$\mu$m with $Y_2O_3$ powder of 5% by weight having a grain size average of 1 $\mu$m and $Al_2O_3$ of 5% by weight added thereto as sub-components was kneaded in a kneader together with an organic binder and water. Then the kneaded product was extruded and thus molded into a honeycomb. The molded product was then held and sintered in a nitrogen ambient of an atmospheric pressure of one at 1650° C. for three hours. The sintered porous medium had a solid portion formed of silicon nitride grains having an aspect-ratio average of 1.5 and bound together via an oxide containing the sub-component to form a three-dimensional network structure, and it had a porosity of 35%, a permeation-diameter average of 0.2μm and a 3-point bending strength of 90 MPa.

Also referring to Table 1, the unit of alumina based ceramic labeled AL was prepared as below: Initially $Al_2O_3$ powder of α type having a grain size average of 1 μm with MgO powder of 3% by weight having a grain size average of 1 μm added thereto as a sub-component was kneaded in a kneader together with an organic binder and water. Then the kneaded product was extruded and thus molded into a honeycomb. The molded product was then held and sintered in the atmosphere at 1600° C. for 30 minutes. The sintered porous medium had a solid portion formed of grains having a grain size average of 1 μm and bound together via an oxide containing the sub-component and also had spherical, distributed pores, and it had a porosity of 30%, a permeation-diameter average of 0.2 μm and a 3-point bending strength of 40 MPa.

Also referring to Table 1, the unit of mullite based ceramic labeled ML was prepared as below: Initially $Al_2O_3$ powder of α type having a grain size average of 1 μm and $SiO_2$ powder having a grain size average of 1 μm were balanced at a mole ratio of 3:2 and such powder of 100 parts by weight with $Na_2O$ of one part by weight added thereto as a sub-component was kneaded in a keader together with an organic binder and water. Then the kneaded product was extruded and thus molded into a honeycomb. The molded product was then held and sintered in the atmosphere at 1600° C. for 30 minutes. The sintered porous medium had a solid portion formed of mullite grains having a grain-size average of 2 μm and an aspect-ratio average of four and bound together via an oxide containing the sub-component to form a three-dimensional network structure and had distributed, slit-like pores, and it also had a porosity of 30%, a permeation-diameter average of 0.2 μm and a 3-point bending strength of 30 MPa.

The units fabricated under the above various conditions all had a square cross section having a side of 4 mm and each had a cell wall having a thickness with a variation, as provided in Table 1. All units had external dimensions including to a length of 500 mm, although they had their cross sectional dimensions varied to have the same three sizes as applied in the first embodiment and there were also provided units with their square cross sections having their respective sides of 25.4 mm and 12.3 mm. The units had their honeycomb portions and external dimensions adjusted when they were extruded and thus molded. The various units as described above were combined, and arranged in and fixed to their respective casings having the same shape as applied in the first embodiment, to assemble filters with the different casing area occupancies of Table 1 through a procedure similar to that used in the first embodiment. Each unit had its discharge-passage length average adjusted depending on the number of discharge passages for each cross section and the number of cross sections with discharge passages. Such filters were then subjected to a cross-flow filtration test under the same filtering conditions as applied in the first embodiment and their respective permeated flows were measured. Table 1 and FIGS. 19–22 represent the measurements. Although not provided in the Table, as well as the units of a porous medium of silicon nitride based ceramic SN1, those of a porous media of silicon nitride based ceramic SN2, alumina based ceramic AL and mullite based ceramic ML were also tested on how their casing area occupancies and their ratios of a discharge-passage length average to a casing's inner diameter affect their permeated flows. The test results have revealed that while SN2, AL, and ML, corresponding to samples 22, 23 and 24, provide generally smaller permeated flows than SN1 corresponding sample 11, SN2, AL, and ML molded into such a honeycomb structure as applied to SN1 are almost as effective in enhancing a permeated flow as SN1.

TABLE 1

| | | Unit | | | | | | | |
|---|---|---|---|---|---|---|---|---|---|
| | | Porous Medium | | Casing | Discharge-Channel | Ratio of L to Inner | | | |
| | | Solid Portion | | | | | | | |
| Sample No. | Material | Thickness Average (mm) | Variation in Thickness (%) | Area Occupancy (%) | Length Average L (mm) | Diameter of Casing (%) | Filtration Area (m²) | Permeated Flow (l/min) | Notes |
| *1 | SN1 | 0.3 | ±10 | 33 | 35 | 40 | 0.67 | 32 | Variation in Casing Area Occupancy |
| 2 | SN1 | 0.3 | ±10 | 35 | 35 | 40 | 0.70 | 48 | |
| 3 | SN1 | 0.3 | ±10 | 40 | 35 | 40 | 0.76 | 60 | |
| 4 | SN1 | 0.3 | ±10 | 60 | 35 | 40 | 1.20 | 85 | |
| 5 | SN1 | 0.3 | ±10 | 70 | 35 | 40 | 1.42 | 92 | ↓ |
| 6 | SN1 | 0.08 | ±10 | 60 | 35 | 40 | 1.20 | 88 | Variation in Thickness of Solid |
| 7 | SN1 | 0.1 | ±10 | 60 | 35 | 40 | 1.20 | 86 | Portion of Porous Medium |
| 8 | SN1 | 0.5 | ±10 | 60 | 35 | 40 | 1.20 | 80 | |
| 9 | SN1 | 0.9 | ±10 | 60 | 35 | 40 | 1.20 | 76 | |
| 10 | SN1 | 1.0 | ±10 | 60 | 35 | 40 | 1.20 | 74 | |
| 11 | SN1 | 1.5 | ±10 | 60 | 35 | 40 | 1.20 | 70 | ↓ |
| 12 | SN1 | 0.3 | ±10 | 60 | 8 | 9 | 1.20 | 82 | Variation in Ratio of L to Inner |
| 13 | SN1 | 0.3 | ±10 | 60 | 9 | 10 | 1.20 | 91 | Diameter of Casing |
| 14 | SN1 | 0.3 | ±10 | 60 | 22 | 25 | 1.20 | 92 | |
| 15 | SN1 | 0.3 | ±10 | 60 | 24 | 27 | 1.20 | 82 | |
| 16 | SN1 | 0.3 | ±10 | 60 | 44 | 50 | 1.20 | 80 | |
| 17 | SN1 | 0.3 | ±10 | 60 | 46 | 52 | 1.20 | 72 | ↓ |
| 18 | SN1 | 0.3 | ±15 | 60 | 35 | 40 | 1.20 | 83 | Variation in Thickness of Membrane |
| 19 | SN1 | 0.3 | ±20 | 60 | 35 | 40 | 1.20 | 80 | (Solid Portion) |
| 20 | SN1 | 0.3 | ±25 | 60 | 35 | 40 | 1.20 | 73 | ↓ |
| 21 | SN2 | 0.5 | ±10 | 60 | 35 | 40 | 1.20 | 29 | Commercially Available Silicon Nitride |
| 22 | SN2 | 1.5 | ±10 | 60 | 35 | 40 | 1.20 | 24 | ↓ |
| 23 | AL | 1.5 | ±10 | 60 | 35 | 40 | 1.20 | 12 | Alumina |

TABLE 1-continued

| | | Porous Medium | | Casing | Unit Discharge-Channel | Ratio of L to Inner | | | |
|---|---|---|---|---|---|---|---|---|---|
| | | Solid Portion | | | | | | | |
| Sample No. | Material | Thickness Average (mm) | Variation in Thickness (%) | Area Occupancy (%) | Length Average L (mm) | Diameter of Casing (%) | Filtration Area (m²) | Permeated Flow (l/min) | Notes |
| 24 | ML | 1.5 | ±10 | 60 | 35 | 40 | 1.20 | 10 | Mullite |

Comparative Example Marked *

Figure 19:
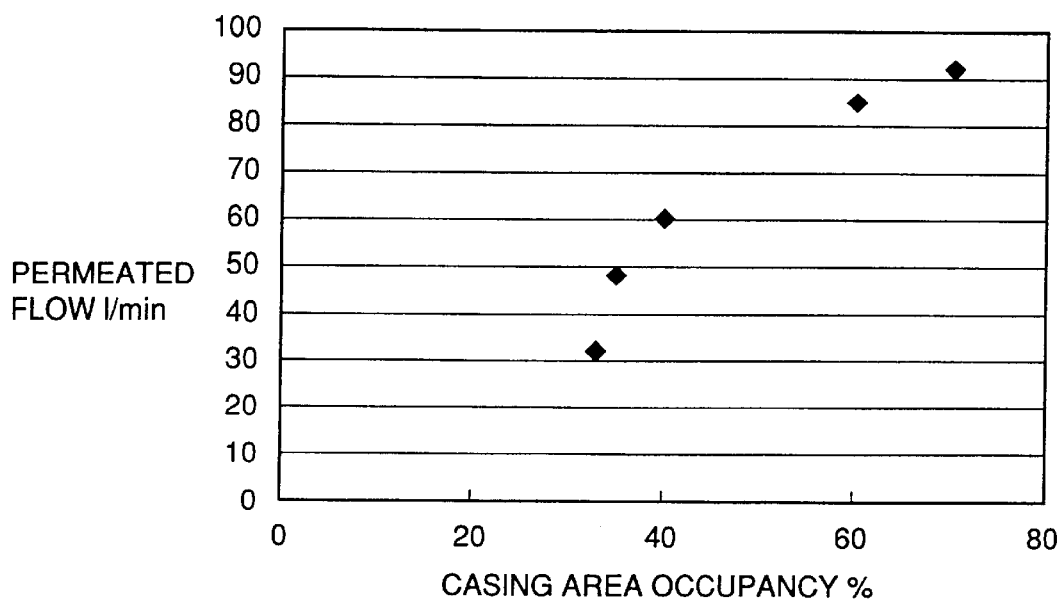
FIG. 19 is a graph of permeated flow versus casing area occupancy in cross section.
Figure 20:
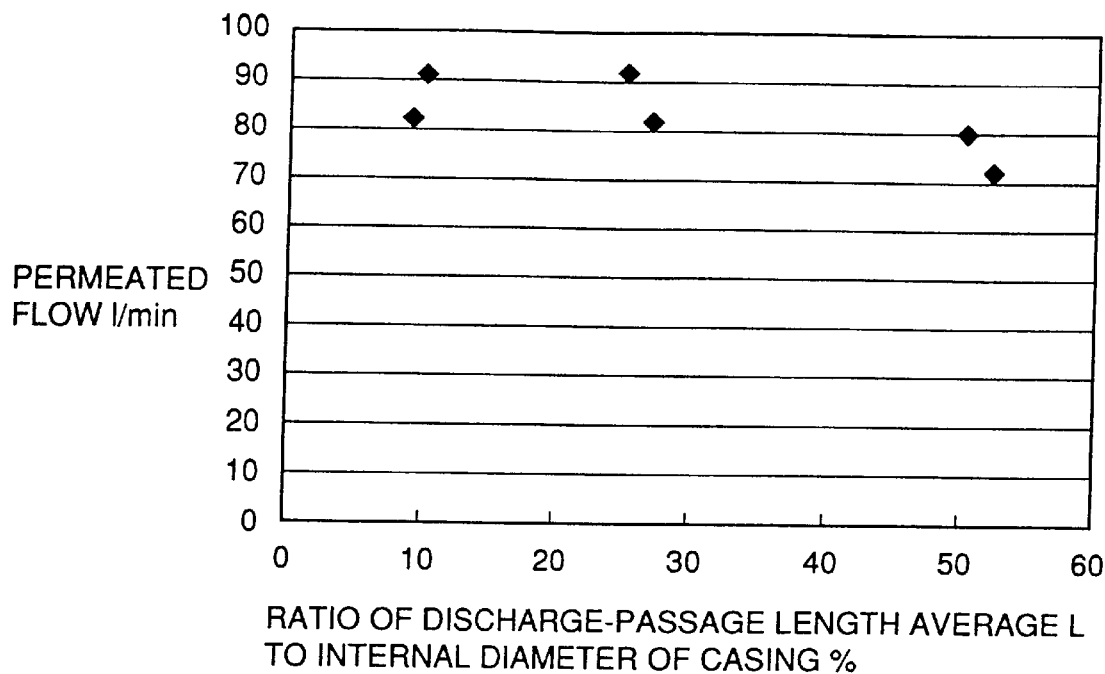
FIG. 20 is a graph of permeated flow versus the ratio of a discharge-passages length average L to an inner diameter of a casing.

The above results have revealed that:

(1) as shown in FIG. 19, a casing area occupancy of no less than 35% results in a filter having a permeated flow significantly higher than a casing area occupancy of no more than 35%. A casing area occupancy of no less than 60% is more preferable, as shown in FIG. 19;

(2) when filters have a same casing area occupancy, a filter with discharge passages having a length average of no more than half the inner diameter of the casing can provide a significantly larger permeated flow than that with discharge passages having a length average of no less than half the inner diameter of the casing. A more preferable discharge-passage length average is one tenth to one fourth of the inner diameter of a casing, as shown in FIG. 20; and (3) furthermore the honeycomb structure as disclosed in the present invention allows porous media of various types of ceramic to effectively provide enhanced permeated flows in accordance with the present invention. In particular, a unit of a silicon nitride ceramic SN1 porous medium can be used to provide a filter having a significantly high level of permeated flow.

Figure 21:
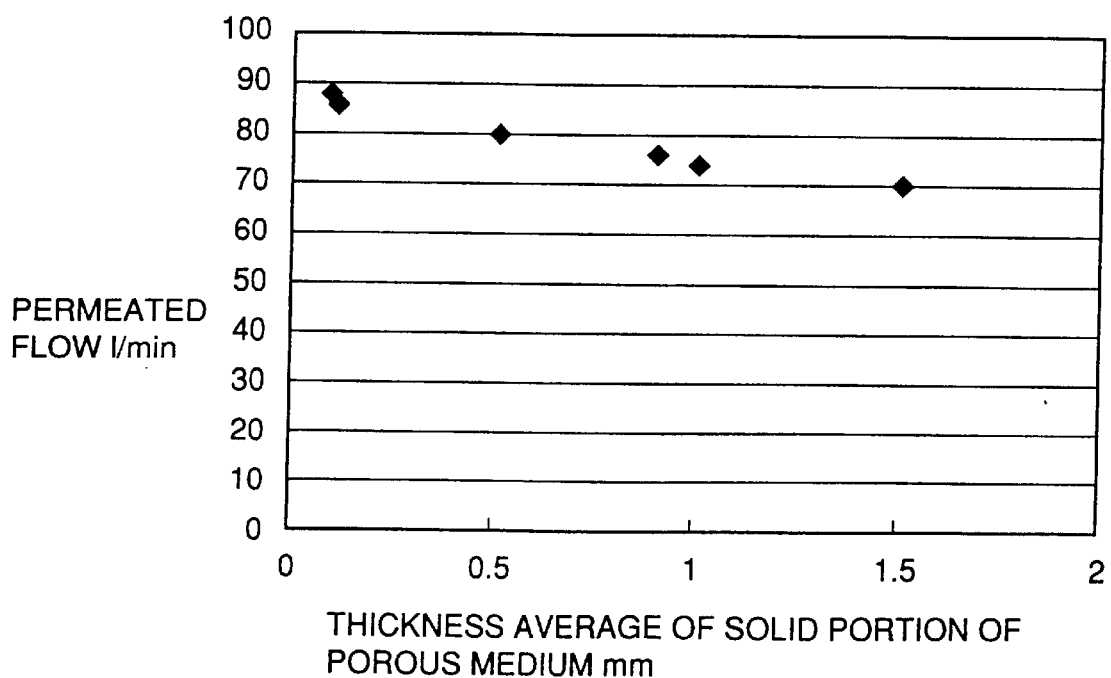
FIG. 21 is a graph of permeated flow versus thickness average of a porous medium's solid portion.
Figure 22:
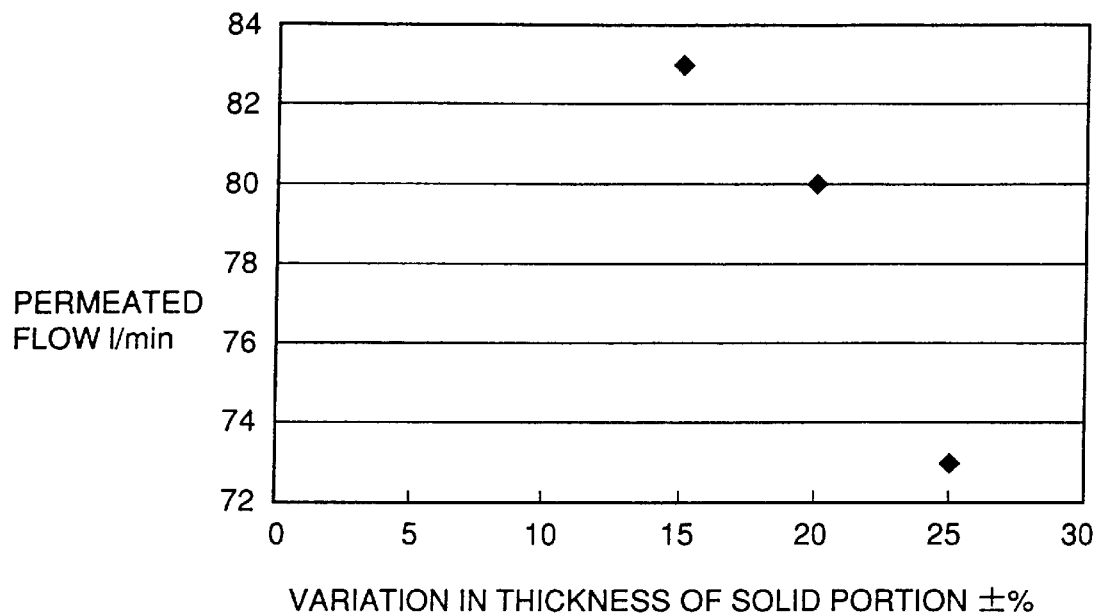
FIG. 22 is a graph of permeated flow versus thickness variation of a porous medium's solid portion.
Figure 23:
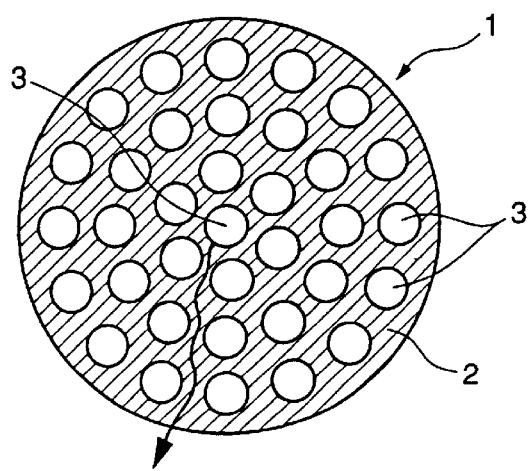
FIG. 23 is a cross section of a conventional, monolith ceramic filter unit.

Note that FIG. 21 is a graph of permeated flow versus solid-portion thickness average and FIG. 22 is that of permeated flow versus solid-portion thickness variation. The graphs have revealed that it is a desirable feature that a solid portion should have a thickness variation limited to ±20% around the solid-portion thickness average.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A filter comprising:

a casing surrounding a casing interior space with a generally round cross-section having a casing inner diameter and a casing interior cross-sectional area on a cross-sectional plane; and a plurality of filter units arranged in said casing interior space;

wherein each respective filter unit of said filter units respectively comprises a porous ceramic medium forming an outer peripheral wall and inner separating walls that respectively bound and separate from each other plural channels that each extend in an extension direction between opposite first and second ends of said respective filter unit;

wherein said channels include open channels that penetrate openly entirely through said respective filter unit in said extension direction between said opposite first and second ends, and closed channels that are each closed at said first and second ends;

wherein each said respective filter unit has discharge holes that pass through said inner separating walls to communicate adjacent ones of said closed channels with each other and that do not communicate into said open channels, and first and second discharge ports that pass through said outer peripheral wall respectively at opposite sides of said respective filter unit to communicate into respective ones of said closed channels, so as to establish a flow communication path with a respective flow path distance between said first and second discharge ports through respective ones of said closed channels communicated with each other through said discharge holes;

wherein each said respective filter unit has a respective filter unit cross-sectional area on said cross-sectional plane, and a total sum of said respective filter unit cross-sectional areas corresponds to at least 35% of said casing interior cross-sectional area; and wherein an average of said respective flow path distances of said flow communication paths of all of said filter units is equal to no more than one half of said casing inner diameter.

2. The filter according to claim 1, wherein said total sum of said respective filter unit cross-sectional areas corresponds to at least 60% of said casing interior cross-sectional area.

3. The filter according to claim 1, wherein said average of said respective flow path distances is equal to no less than one tenth and no more than one fourth of said casing inner diameter.

4. The filter according to claim 1, wherein said open channels and said closed channels are respectively linearly aligned and arranged in a grid pattern as seen on said cross-sectional plane.

5. The filter according to claim 4, wherein said open channels are linearly aligned with each other in first rows or columns, said closed channels are linearly aligned with each other in second rows or columns, and said second rows or columns alternate with said first rows or columns on said cross-sectional plane.

6. The filter according to claim 5, wherein said first rows or columns and said second rows or columns alternate with each other by a pitch spacing from 0.5 to 3 mm.

7. The filter according to claim 1, wherein said flow communication path extends linearly between said first and second discharge ports through respective ones of said closed channels and respective ones of said discharge holes.

8. The filter according to claim 1, wherein said inner separating walls have local thicknesses that may vary within ±20% relative to an overall average of said local thicknesses.

9. The filter according to claim 1, wherein said filter units include respective filter units having respective different cross-sectional dimensions or shapes.

10. The filter according to claim 1, wherein said porous ceramic medium consists essentially of a silicon nitride based ceramic that comprises columnar grains of at least one of sialon and silicon nitride with an average aspect ratio of at least three, and that further comprises an oxide binder, and wherein said ceramic has a porosity from 30 to 70%, an average permeation diameter from 0.01 to 10 $\mu$m, and a 3-point bending strength of at least 100 MPa.

11. The filter according to claim 1, wherein said casing includes two opposite casing ends respectively having a fluid inlet and a fluid outlet that are in communication with each other through said open channels, and a casing side wall with a discharge opening in communication with said closed channels through said discharge ports.

12. The filter according to claim 1, wherein said casing consists essentially of at least one of plastic, metal and ceramic.

13. The filter according to claim 1, further comprising a seal material selected from a group consisting of plastic metal and ceramic that seals said closed channels at said opposite first and second ends.

14. The filter according to claim 1, wherein said casing has an outer diameter from 10 to 500 mm on said cross-sectional plane, and a length from 100 to 2000 mm in said extension direction.

* * * * *

UNITED STATES PATENT AND TRADEMARK OFFICE
CERTIFICATE OF CORRECTION

PATENT NO. : 6,361,693 B1 Page 1 of 1
DATED : March 26, 2002
INVENTOR(S) : Park

It is certified that error appears in the above-identified patent and that said Letters Patent is hereby corrected as shown below:

Column 10,
Line 16, after "to", replace "10%" by -- ±10% --.

Column 18,
Line 7, after "plastic", insert -- , --.

Signed and Sealed this

Third Day of September, 2002

Attest:

Attesting Officer

JAMES E. ROGAN
Director of the United States Patent and Trademark Office